United States Patent Office  3,015,888
Patented Jan. 9, 1962

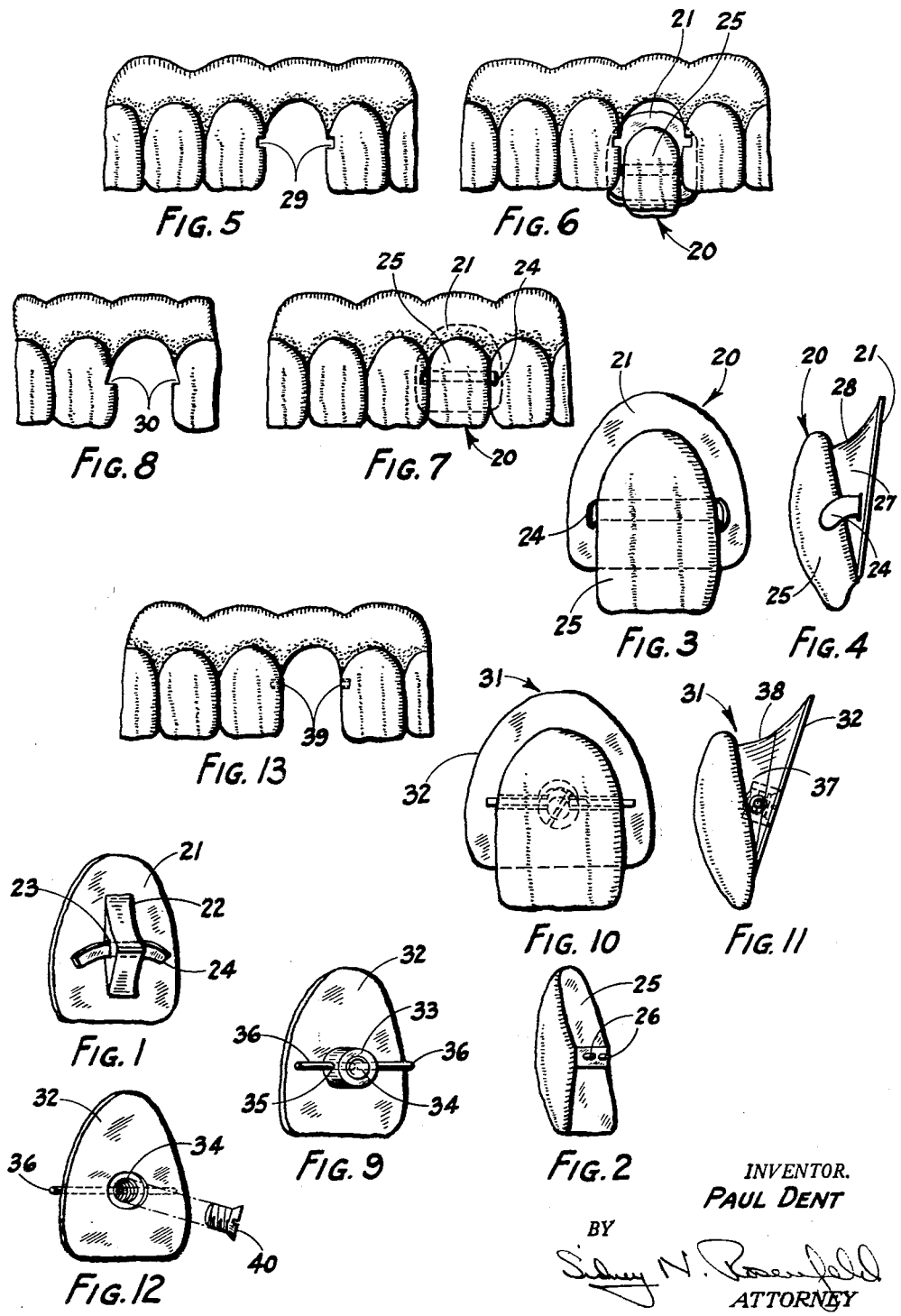

3,015,888
ARTIFICIAL TOOTH STRUCTURE AND PLATE THEREFOR
Paul Dent, 34 N. George St., York, Pa.
Filed Apr. 28, 1959, Ser. No. 809,453
3 Claims. (Cl. 32—9)

This invention relates to an artificial tooth structure. More particularly, the invention relates to means for maintaining an artificial tooth structure within the mouth without any visible evidences thereof.

In replacing, from the front of the upper jaw, a tooth lost by extraction, and where it is desired to insert a removable artificial tooth structure, it is necessary to maintain the same in the mouth by means of visible prongs adapted to fit around adjoining teeth. Applicant has devised a relatively simple structure for replacing a tooth extracted from the mouth, as set out above, which structure is held securely in place in the mouth by means not visible to the sight.

It is an object of the invention, therefore, to provide an artificial tooth structure for replacing an extracted tooth, which structure is removably mounted in the space left by said tooth, and non-visible means are provided for maintaining said structure in the space left by the extracted tooth.

A further object of the invention is to provide a dental structure for receiving an artificial tooth thereon, said structure having means thereon for removably mounting the same in the mouth. Yet another object is to provide a dental structure of the type just above mentioned wherein said mounting means are not visible to the sight. A still further object is to provide a dental structure of the type above mentioned wherein said mounting means comprises a flat spring element adapted to expand into notches provided in teeth alongside of a space to be filled. Still another object is to provide a dental structure of the type first mentioned wherein said mounting means comprises a pair of pins adapted to be received in bushings provided in teeth alongside of a space to be filled.

The invention consists of the novel constructions, arrangements and devices to be hereinafter described and claimed for carrying out the above-stated objects and such other objects as will appear from the following description of a preferred embodiment of the invention described in reference to the accompanying drawings, in which:

FIG. 1 is a view in perspective of a dental structure for retaining an artificial tooth;

FIG. 2 is a view in perspective of an artificial tooth adapted to be mounted on the dental structure of FIG. 1;

FIGS. 3 and 4 are front and side elevational views respectively of a completed tooth structure;

FIG. 5 is a view, in elevation, of a portion of an upper jaw, showing an extracted tooth and the space left thereby and prepared to receive the tooth structure of FIGS. 3 and 4;

FIG. 6 is a view similar to FIG. 5, but showing applicant's tooth structure partially inserted in the space left by the extracted tooth;

FIG. 7 is a view similar to FIGS. 5 and 6, showing the tooth structure in position;

FIG. 8 is a view similar to FIG. 5, showing, however, an alternate method for maintaining the tooth structure in the mouth;

FIG. 9 is a view in perspective of a second embodiment of a dental structure for retaining an artificial tooth;

FIGS. 10 and 11 are front and side elevational views respectively of a completed tooth structure according to the second embodiment;

FIG. 12 is a view in perspective of the dental structure of FIG. 9 taken from the rear thereof; and FIG. 13 is a view similar to FIG. 5, illustrating the method of removably maintaining the tooth structure of FIGS. 10 and 11 in the mouth.

Like numerals refer to like parts throughout the several views.

Turning now to the drawings, the first embodiment of the tooth structure will be described with reference, particularly, to FIGS. 1 through 4. Tooth structure 20 comprises a gold tooth retaining plate 21 (shown particularly in FIG. 1), having thereon a tooth mounting boss 22 attached thereto or integral therewith. Boss 22 has a slot 23 formed therethrough, which slot receives a flat, stainless steel, spring-like member 24. An artificial tooth designated as 25 generally has two pins 26 imbedded therein, which pins are adapted to receive boss 22 therebetween for soldering and permanent attachment of the tooth to the plate 21. After a tooth 25 is suitably attached to a plate 21 (see particularly FIG. 4), then a plastic fill 27 is suitably, smoothly molded therebetween to fill all crevices. At the same time, fill 27 terminates in an edge portion 28, adapted to conform with the gum over the space in the mouth to be filled. Spring 24 then may be bent around tooth 25 (as seen particularly in FIGS. 3 and 4), to form the finished tooth structure 20.

In preparing the mouth to receive tooth structure 20, notches 29 are ground on either side of the space left by the extracted tooth at a point to accommodate spring 24. These notches are very much exaggerated, as seen in FIG. 1 for, in reality, they will be of the depth of only perhaps 5/1000 of an inch in order to accommodate spring 24.

In preparing a tooth structure to fit a particular space, plate 21 (which originally is of sufficient size to accommodate the largest space to be expected) is ground down to fit the particular space encountered. An artificial tooth 25, of suitable size and configuration, is then selected to just fit the space to be filled. Tooth 25 is then secured to the plate 21 at just the proper angle and position to suitably fill the vacated space when plate 21 is mounted within the mouth, with spring 24 being received in notch 29.

Turning now to FIG. 6, it can be seen that, in placing the completed tooth structure into the vacant space, spring 24 is compressed between adjacent teeth, while plate 21 fits behind the adjacent teeth. When the tooth structure is completely in place, as seen in FIG. 7, then spring 24 will have snapped into notches 29, maintaining the tooth structure in position. As brought out before, edge portion 28 of the completed tooth structure is so shaped as to nest against the gum at the base of the tooth structure, and with the side portions of plate 21 snugly fitting behind the adjacent teeth for support.

To remove the tooth structure from the mouth, it is only necessary to rotate the tooth structure about an imaginary axis that would lie parallel to spring 24, but slightly below it. Turning now to FIG. 7, the tooth would be rotated in such a manner that the upper portion thereof would be rotated away from the gum or into the plane of the paper. This rotational movement would continue until the ends of spring 24 had cleared notches 29, after which time the tooth structure would be removed merely by withdrawing it along a vertical line.

Instead of providing notches 29 in the adjacent teeth, as shown in FIG. 5, a notch 30, as shown in FIG. 8, may be provided. An inspection of FIG. 8 reveals that the action, both in placing the tooth in the space left by the missing tooth and removing it therefrom, would be identical to that previously described. It, of course, will also be understood that the completed tooth structure for the vacant space, as shown in FIG. 8, will be prepared in exactly the manner as set out above.

Where a tooth structure is desired of somewhat more permanency but, nevertheless, removable, a tooth structure 31 set out in FIGS. 9-11 may be utilized. Tooth structure 31 comprises a gold plate 32, comparable to plate 21 in its general shape and outline. Plate 32 has a cylindrical sleeve-like boss 33 formed thereon or integral therewith. Boss 33 has a passageway 34 formed therethrough. Plate 32 has an aperture formed therein adapted to coincide with the passageway 34 of cylindrical boss 33. Boss 33 has a pair of transverse apertures 35 formed through the walls thereof, each 180° removed from the other. A pair of platinum or stainless steel pins 36 are received in apertures 35, and are then crimped on the inner ends thereof so that they may not thenceforth be removed from the apertures 35. Pins 36 are of sufficient length to bridge the widest gap that would ordinarily be encountered in providing a tooth structure to fill a space left by an extracted tooth. An artificial tooth 25 is suitably mounted on plate 32 with pins 26 suitably receiving boss 33 for permanent attachment thereto. As in the embodiment shown in FIGS. 3 and 4, a plastic fill 37 is provided to fill the space between the tooth and plate. Fill 37 is formed with an upper edge 38 of a shape adapted to conform to the gum above the space to be filled by the tooth structure.

In preparing the mouth to receive a tooth structure 31, teeth adjacent to the space to be filled are drilled and provided with bushings 39, as clearly shown in FIG. 13. Tooth structure 31 is prepared to fit the particular space to be filled in the same manner as is tooth structure 20. As with plate 21, plate 32 is of sufficient size to fill the largest space likely to be encountered. Plate 32 must, therefore, be trimmed down to fill the particular space to be filled and, in addition, pins 36 are ground down to the desired width. In placing the completed tooth structure 31 into the vacant space (as seen in FIG. 13), pins 36 are pushed to their innermost position within the tooth structure, as can be clearly seen in FIG. 9, so that the inner crimped ends thereof are in contact within passageway 34 of sleeve-like boss 33. This, then, provides sufficient clearance for the tooth structure to be inserted into the space to be filled, with the indrawn pins 36 clearing the adjacent teeth. When the tooth structure is fully in place, a sharp instrument is inserted into the cylindrical passageway 34, and the pins 36 are forced outwardly (see FIG. 12), one each entering a bushing 39. Means, such as a screw 40, is then inserted into the passageway 34 of boss 33, which then prevents pins 36 from being moved into their innermost position, thereby maintaining the completed tooth structure securely in the mouth.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:
1. A dental structure for receiving an artificial tooth comprising a plate, an upstanding boss attached to said plate for retaining an artificial tooth thereon, said boss having a transverse slot therethrough; and means for retaining said structure in a mouth comprising a flat, leaf-type spring removably mounted in said slot.

2. An artificial tooth structure comprising an artificial tooth having mounting means formed therein; a plate; boss means on said plate receiving said tooth mounting means; and means for retaining said tooth structure in a mouth comprising laterally expanding means attached to said plate constructed and arranged to be laterally received by adjacent teeth, said laterally expanding means for retaining said tooth structure in a mouth comprising a flat, leaf-type spring slidably mounted in said tooth structure.

3. The tooth structure of claim 2, wherein said plate is of sufficient width to underlie, at least partially, teeth adjacent a space to be filled in the mouth.

References Cited in the file of this patent
UNITED STATES PATENTS

| | | |
|---|---|---|
| 1,163,074 | Fink | Dec. 7, 1915 |
| 1,369,509 | Weintraub | Feb. 22, 1921 |
| 1,819,296 | Kunde | Aug. 18, 1931 |
| 2,009,434 | Chayes et al. | July 30, 1935 |